United States Patent
Jagjitpati et al.

(10) Patent No.: US 9,887,580 B2
(45) Date of Patent: Feb. 6, 2018

(54) EMERGENCY LIGHTING DEVICE

(71) Applicant: TRIDONIC UK LTD, Basingstoke (GB)

(72) Inventors: Shukla Jagjitpati, Spennymoor (GB); Ian Wilson, Sunderland (GB)

(73) Assignee: TRIDONIC UK LTD, Basingstoke (GB)

( * ) Notice: Subject to any disclaimer, the term of this patent is extended or adjusted under 35 U.S.C. 154(b) by 331 days.

(21) Appl. No.: 14/421,648

(22) PCT Filed: Aug. 21, 2013

(86) PCT No.: PCT/IB2013/002017
§ 371 (c)(1),
(2) Date: Feb. 13, 2015

(87) PCT Pub. No.: WO2014/030062
PCT Pub. Date: Feb. 27, 2014

(65) Prior Publication Data
US 2015/0214785 A1    Jul. 30, 2015

(30) Foreign Application Priority Data
Aug. 21, 2012   (DE) .................. 10 2012 214 832

(51) Int. Cl.
*H02J 9/00*     (2006.01)
*H02J 7/00*     (2006.01)
(Continued)

(52) U.S. Cl.
CPC ............ *H02J 9/065* (2013.01); *H02J 7/0072* (2013.01); *H05B 33/0815* (2013.01); *Y02B 20/346* (2013.01); *Y10T 307/625* (2015.04)

(58) Field of Classification Search
CPC .... H02J 9/065; H02J 7/0072; H05B 33/0815; Y10T 307/615; Y10T 307/625; Y02B 20/346
(Continued)

(56) References Cited

U.S. PATENT DOCUMENTS 4,988,889 A     1/1991   Oughton, Jr.
2003/0173907 A1    9/2003   Chen et al.
(Continued)

FOREIGN PATENT DOCUMENTS

DE    3435432 A1    4/1986
DE    20300733 U1    6/2003
(Continued)

OTHER PUBLICATIONS

Yung-Chun Wu et al: "A Three-in-One Converter for Regular and Emergency Lighting Applications", IEEE Transactions on Industry Applications, IEEE Service Center, Piscataway, NJ, US, Bd. 45, Nr. 1. Jan. 1, 2009 (Jan. 1, 2009), Seiten 108-115, XP011241649, ISSN: 8893-9994, DOI: 10.1109/TIA.2008.2009907.
(Continued)

*Primary Examiner* — Hal Kaplan
(74) *Attorney, Agent, or Firm* — Volpe and Koenig, P.C.

(57) ABSTRACT

An emergency lighting device for controlling a lighting means includes an energy store, such as a battery or an accumulator, a charging circuit for the energy store having connections for an AC voltage (alternating voltage), the charging circuit has a potential isolation element, a potentially isolated clocked converter supplied from the energy store and having a switch, preferably a flyback converter. The converter can be supplied only by the energy store, a control circuit for controlling the switch, and a supply path from the secondary side of the converter to connections for the lighting means.

9 Claims, 6 Drawing Sheets

(51) Int. Cl.
*H02J 9/06* (2006.01)
*H05B 33/08* (2006.01)
(58) Field of Classification Search
USPC .................................................... 307/64, 66
See application file for complete search history.

(56) References Cited

U.S. PATENT DOCUMENTS

2006/0066258 A1   3/2006   Lane et al.
2012/0104858 A1   5/2012   Noe

FOREIGN PATENT DOCUMENTS

| DE | 10259585 | A1 | 7/2003 |
| EP | 0079462 | A2 | 5/1983 |
| EP | 1274286 | A1 | 1/2003 |
| EP | 2823690 | A1 | 1/2015 |
| GB | 2499016 | A | 8/2013 |
| JP | H07222375 | A | 8/1995 |
| JP | 2004260961 | A | 9/2004 |
| WO | 2005060067 | A1 | 6/2005 |
| WO | 2007121860 | A1 | 11/2007 |
| WO | 2008151800 | A1 | 12/2008 |
| WO | 2010139080 | A1 | 12/2010 |
| WO | 20131322003 | A1 | 9/2013 |

OTHER PUBLICATIONS

Yung-Chun Wu et al: "A Three-in-One Converter for Regular and Emergency Lighting Applications", IEEE Transactions on Industry Applications, IEEE Service Center, Piscataway, NJ, US, vol. 45, No. 1, Jan. 1, 2009 (Jan. 1, 2009), pp. 108-115, XP011241649, ISSN: 0093-9994, DOI: 10.1109/TIA.2008.2009907.

EMERGENCY LIGHTING DEVICE

FIELD OF THE INVENTION

The invention relates to an emergency lighting device for actuating a light-emitting means, in particular an LED or an LED string. In this case, all circuit parts of the emergency lighting device are provided in parallel with an LED driver (offline LED driver or else standard LED driver when there is an AC supply present), which supplies the light-emitting means, which will be understood to mean in particular an LED or an LED string in the text which follows, during normal operation/mains operation.

BACKGROUND

This means that the emergency lighting device is preferably only used for emergency lighting operation, i.e. in the case of failure of the mains voltage/supply voltage (AC voltage) in order to supply a voltage/a current for operation to the corresponding current paths for supplying current/voltage to the light-emitting means during emergency lighting operation. When a mains voltage/supply voltage is being applied, a supply by the emergency lighting device does not take place, however, when there is a parallel standard LED driver present. However, it is also possible for the emergency lighting device to also be configured so as to supply the light-emitting means even when the mains voltage/supply voltage is applied.

The emergency lighting device has an energy store, for example a battery or a rechargeable battery, which is charged from the mains voltage via a charging circuit comprising an electrical isolation element, in particular a converter and preferably a flyback converter.

The electrical isolation element in this case ensures electrical isolation or galvanic isolation between the mains voltage and the energy store.

One disadvantage with the arrangement known from the prior art, however, consists in that, when the mains potential is present at the light-emitting means, i.e. when the light-emitting means is supplied via the LED driver for mains operation or normal operation, parts of the emergency lighting device are connected to the mains potential, but are not galvanically isolated from the remaining circuit parts of the emergency lighting device, in particular from the energy store.

A further disadvantage of the prior art consists in that the current supplied to the light-emitting means or the supplied power is regulated or adjusted.

SUMMARY

The invention therefore provides an emergency lighting device, a luminaire comprising an emergency lighting device and a method for operating the emergency lighting device in accordance with the independent patent claims. Developments of the invention are the subject matter of the independent claims.

In one aspect, the invention relates to an emergency lighting device for actuating a light-emitting means, having an energy store, such as, for example, a battery or a rechargeable battery, a charging circuit for the energy store comprising terminals for an AC voltage, wherein the charging circuit has a first electrical isolation element. A clocked second converter comprising at least one switch, preferably a flyback converter, is supplied from the energy store, wherein the second converter can be supplied preferably exclusively by the energy store. A control circuit for actuating the switch is provided, wherein the control circuit actuates the switch in such a way that the discharge current or the discharge power of the energy store is regulated, preferably independently of the light emission of the connected light-emitting means. The discharge current is drawn from the energy store and supplies the second converter. The power drawn from the energy store in the process is the discharge power. The control circuit can actuate the switch in such a way that a peak current of the discharge current is limited from cycle to cycle.

The invention also relates to a method for actuating a light-emitting means comprising an emergency lighting device, wherein an energy store, such as, for example, a battery or a rechargeable battery, is charged via a charging circuit comprising terminals for an AC voltage when the AC voltage is applied, wherein a clocked second converter comprising at least one switch, preferably a flyback converter, is supplied from the energy store, at least in the event of a failure of the AC voltage, wherein the switch is actuated in such a way that the discharge current or the discharge power of the energy store is regulated, preferably independently of the light emission of the connected light-emitting means. A peak current of the discharge current can be limited from cycle to cycle. For example, the peak current can be limited by the switch.

In one aspect, the invention provides an emergency lighting device for actuating a light-emitting means, having an energy store, such as, for example, a battery or a rechargeable battery, a charging circuit for the energy store comprising terminals for an AC voltage (also referred to as mains voltage), wherein the charging circuit has a first electrical isolation element, an electrically isolated clocked second converter, which is supplied from the energy store, comprising at least one switch, preferably a flyback converter, wherein the second converter can be supplied preferably exclusively by the energy store, a control circuit for actuating the switch, and a supply path from the secondary side of the second converter to terminals for the light-emitting means.

The second electrical isolation element can be a second converter. In this case, the second converter can be in particular a second flyback converter.

Energy can be supplied to the control circuit via a secondary-side auxiliary winding at the first electrical isolation element and/or a primary-side auxiliary winding at the second converter.

The auxiliary winding at the second electrical isolation element can be configured in such a way that energy is supplied to the control circuit until the second converter is operated in clocked fashion by the control circuit.

Energy can be supplied to the control circuit via the auxiliary winding at the second converter when the control circuit operates the second converter in clocked fashion.

The control circuit can detect the secondary-side voltage at the second converter via the auxiliary winding at the second converter.

The time at which the primary-side coil of the second converter is demagnetized can be detected via the auxiliary winding at the second converter.

The control circuit can initiate renewed switching-on of the clocked switch in the case of detection of the demagnetization of the primary-side coil of the second converter.

The control circuit can optionally change the power output by the second converter depending on the connected light-emitting means.

In a further aspect, the invention provides a luminaire comprising an emergency lighting device. The luminaire can change to an emergency lighting operating mode in the event of a change in an operating voltage.

In yet a further aspect, the invention provides a method for actuating a light-emitting means comprising an emergency lighting device, wherein an electrically isolated clocked second converter comprising a switch, preferably a flyback converter, is supplied from an energy store, for example a battery or a rechargeable battery, and wherein the second converter is supplied preferably exclusively by the energy store.

The second electrical isolation element can be a second converter. The second converter can in particular be a second flyback converter.

BRIEF DESCRIPTION OF THE DRAWINGS

The invention and its configurations will now also be described in respect of the drawings, in which.

DETAILED DESCRIPTION OF THE PREFERRED EMBODIMENTS

Figure 1:
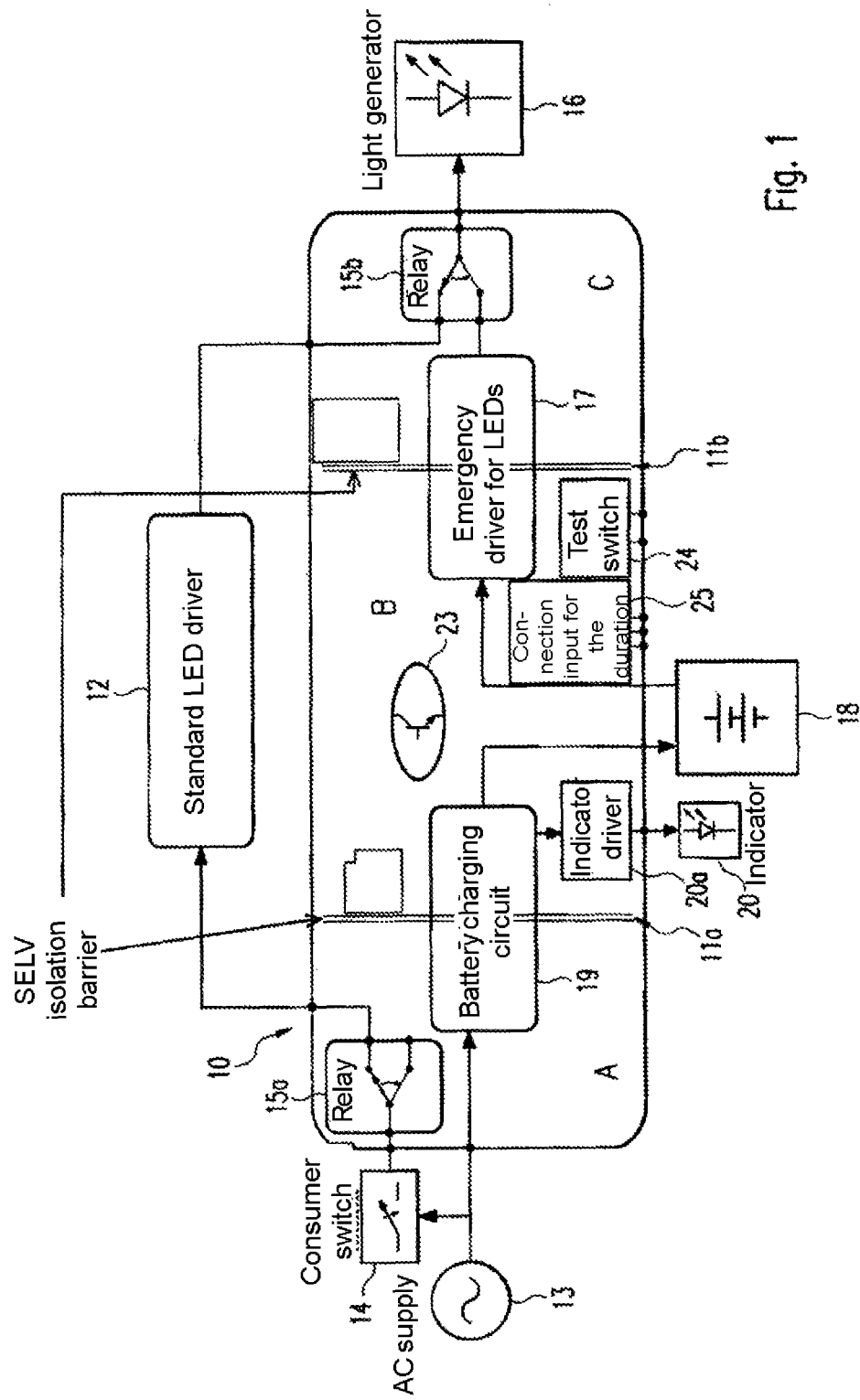
FIG. 1 shows a schematic illustration of an emergency lighting device in accordance with a first aspect of the invention.

FIG. 1 shows, schematically, an emergency lighting device 10 in accordance with a first aspect of the invention. This figure shows schematically that the emergency lighting device 10 is divided into three regions A, B and C, which are each isolated from one another from one another by a safety extra-low voltage (SELV) isolation barrier 11a, 11b. An LED driver 12 for mains operation is referred to in FIG. 1 as "offline" LED driver or as standard LED driver, which can feed the LED when the AC voltage is applied.

FIG. 1 shows that a first current path leads starting from the mains supply source 13 via a mains switch 14, a first relay 15a, the LED driver 12 for mains operation and a second relay 15b to the light-emitting means 16. This current path passes partially through the emergency lighting device 10 (illustrated in regions A and C, in which the first and second relays 15a, 15b are arranged).

The first and second relays 15a, 15b are in this case designed to switch over the load or the light-emitting means 16 from the standard LED driver 12 for mains operation to an emergency LED driver 17 when the mains voltage fails or when the mains voltage moves out of a predetermined range or a predetermined threshold value is exceeded or undershot.

The figure also shows that an energy store 18 is charged by the mains voltage during normal operation via a charging circuit 19. The energy store 18 then supplies, during emergency lighting operation, the emergency LED driver 17, which in turn supplies current to the light-emitting means 16 via the second relay 15b.

An indicator 20, which is actuated via an indicator driver 20a, can in this case signal the emergency lighting operation externally visually and/or acoustically to a user.

The figure also shows that the energy store 18 is isolated from the light-emitting means 16 by a safety extra-low voltage isolation barrier 11b.

In an alternative variant, it is possible for a standard LED driver 12 for the mains operation to be dispensed with and for the emergency LED driver 17 to also perform the function of operation and supply of the light-emitting means 16 when the mains voltage is applied. In this case, the emergency lighting device 10 would be in the form of a so-called combination device, which can operate the light-emitting means 16 when the mains voltage is applied and in the case of a failure of the mains voltage. In this case, it is possible to dispense with the relays 15a and 15b.

Figure 2:
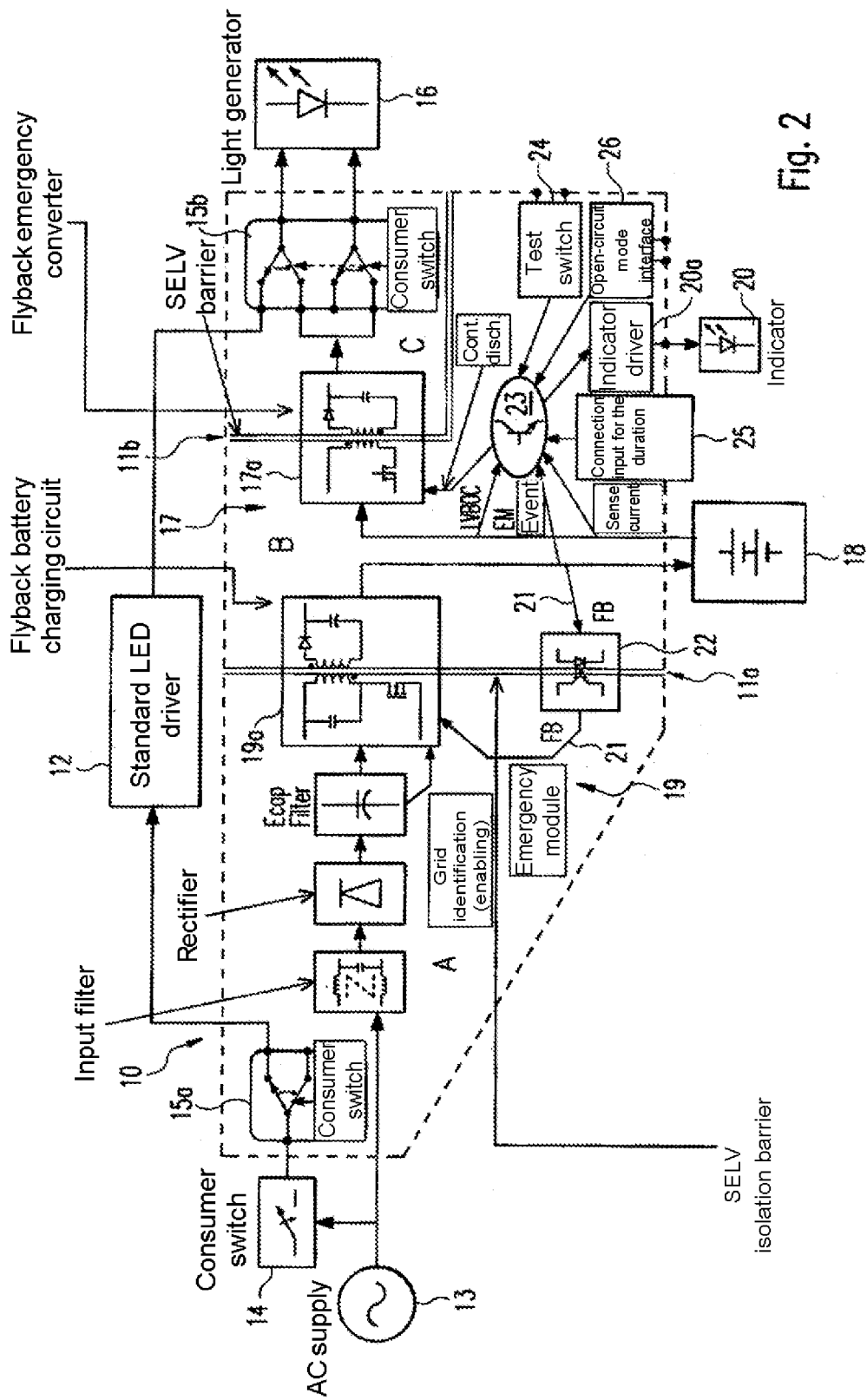
FIG. 2 shows a more detailed schematic illustration of an emergency lighting device in accordance with the first aspect of the invention.

A more detailed view of the first exemplary embodiment is shown in FIG. 2. Here, the charging circuit 19 has in particular a first electrical isolation element 19a, which enables bypassing of the isolation barrier 11a whilst maintaining the galvanic isolation. The first electrical isolation element 19a is a first converter and in particular a first flyback converter, i.e. a first converter comprising a clocked power switch, via which the energy store is charged when the mains voltage is applied, i.e. during normal operation.

The figure also shows a feedback line 21 via an optocoupler 22, via which a feedback signal can be transmitted to the primary side of the charging circuit, for example in order to influence the operation of the clocked power switch of the first converter.

Likewise, the second electrical isolation element 17a of the emergency LED driver 17 is shown, which is designed to bypass the safety extra-low voltage isolation barrier 11b whilst maintaining the galvanic isolation, by means of which the energy store and the secondary-side part of the charging circuit 19 are isolated from the light-emitting means 16 (for example the LED, LED string, . . . ). In the case illustrated, the second electrical isolation element 17a is likewise a converter (also referred to as second converter below) and is in particular a second flyback converter, which is likewise operated in clocked fashion.

FIG. 2 (and also FIG. 1) also shows a control circuit 23, which determines, directly or indirectly, on the basis of the voltage transmitted by the first electrical isolation element 19a of the charging circuit 19/the transmitted current, whether emergency lighting operation is present. The control circuit 23 can therefore detect indirectly or directly the mains voltage (for example by means of a measurement of the voltage on the secondary side of the first electrical isolation element of the charging circuit 19a) and therefore also identify a failure of the mains voltage or a discrepancy between the mains voltage and a predetermined value or a deviation of the mains voltage from a predetermined range.

The control circuit 23 can also control the clocking of the second electrical isolation element 17a of the emergency LED driver 17, and therefore the power, the current and/or the voltage used to supply the light-emitting means 16 during emergency lighting operation.

The control circuit 23 can detect and regulate the current output by the energy store 18 or the output voltage and optionally control the operation of the indicator 20.

Preferably, the control circuit 23 regulates or controls the current output by the energy store 18 or the output voltage or power or else control the power, current and/or voltage which is used to supply the light-emitting means 16 during emergency lighting operation by means of the actuation of an actively controlled switch in the second converter, for example by actuation of the switch M1.

Further information in respect of further modules of the emergency lighting device (a test switch 24 for initiating a test mode, an access 25 for adjusting the emergency lighting duration and/or an open-circuit mode interface 26 are likewise possible) can be received by the control circuit 23, processed thereby and/or transmitted to said control circuit. The access 25 for adjusting the emergency lighting duration can be used preferably for presetting the duration of the emergency lighting period. For example, the emergency lighting device can be set alternatively for an emergency lighting duration of one hour or three hours. This setting can be dependent on the connected energy store or on local presets. An open-circuit mode can be signaled to the emergency lighting device by means of the open-circuit mode interface 26. For example, provision can be made for the complete lighting to be set to an open-circuit mode and therefore for the energy supply to be disconnected. Since this is not an emergency lighting case and the energy stores are therefore not intended to be discharged, the emergency lighting device can be set to an open-circuit mode via the open-circuit mode interface 26.

Figure 3:
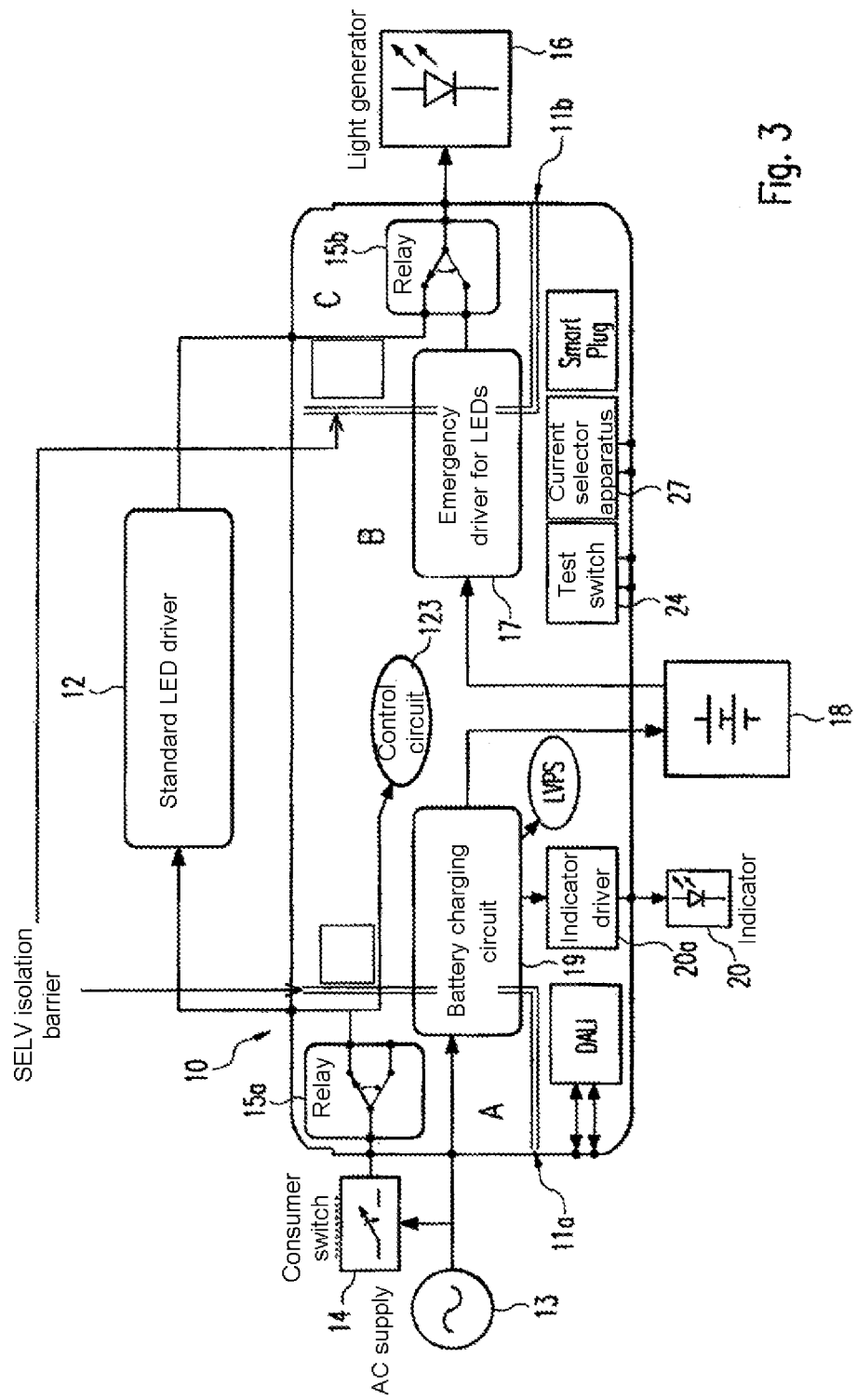
FIG. 3 shows a schematic illustration of an emergency lighting device in accordance with a second aspect of the invention.

FIG. 3 shows a second embodiment of the invention. The embodiment illustrated differs from the embodiment shown in FIG. 1 in particular in that the control circuit 123 is now implemented by a microcontroller (μC), an integrated circuit IC and/or an ASIC. The design of the charging circuit 19 and of the emergency LED driver 17 is in this case substantially identical. The components provided with the same reference symbols are substantially identical in terms of design and function as well.

Figure 4:
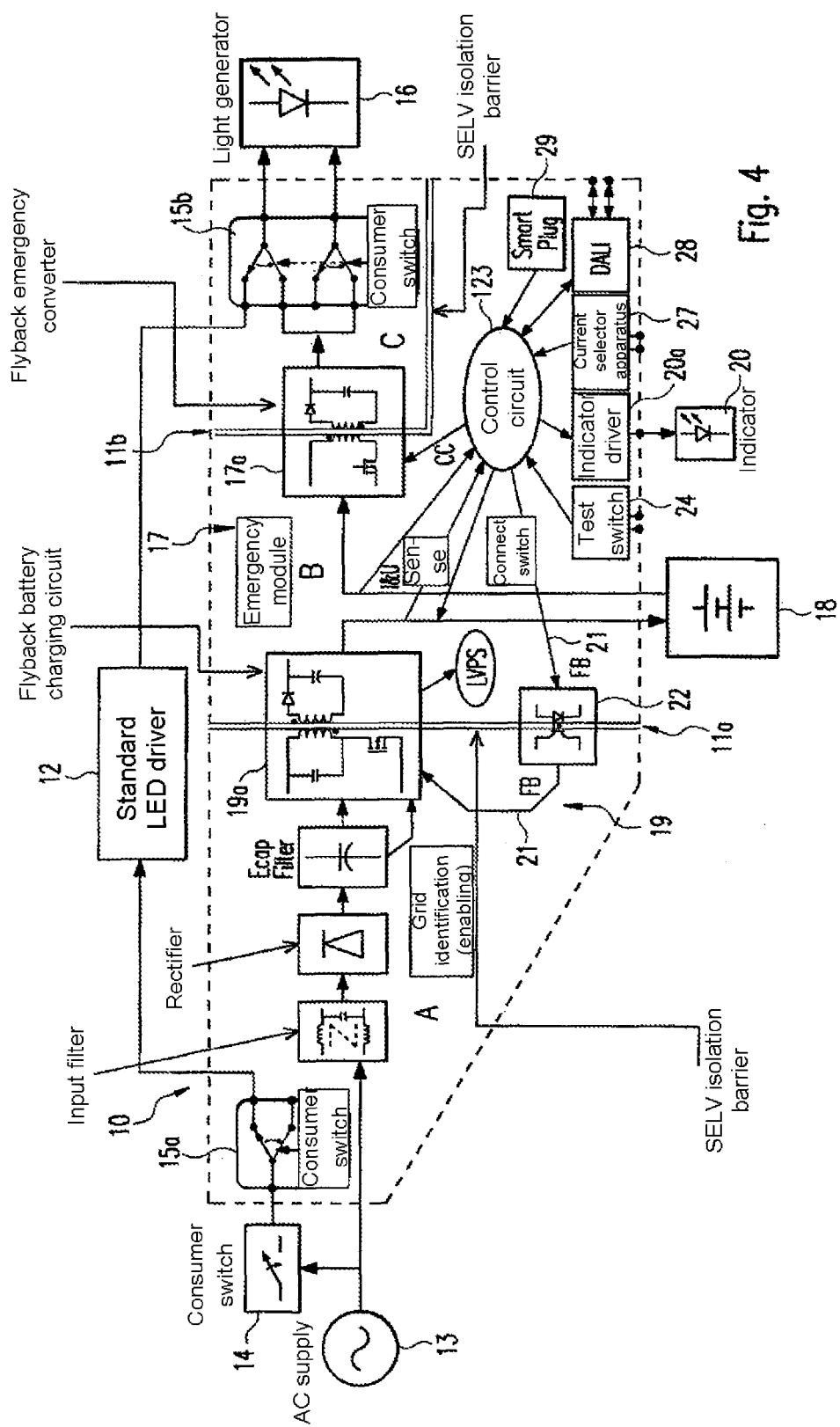
FIG. 4 shows a more detailed schematic illustration of an emergency lighting device in accordance with the second aspect of the invention.

This also applies to FIG. 4, which shows a more detailed schematic illustration of the second embodiment shown in FIG. 3. In this case, a current source with a low voltage (low-voltage power source, LVPS) can be provided in the region of the energy store 18, i.e. on the secondary side of the first electrical isolation element of the charging circuit 19*a* and/or on the primary side of the second electrical isolation element 17*a* of the emergency LED driver 17. The control circuit 123 (IC, ASIC, microcontroller) illustrated can in this case detect the current and/or the voltage used to supply the energy store 18 via the first electrical isolation element 19*a* of the charging circuit 19 and the voltage and/or the current which is supplied by the energy store 19 to the second electrical isolation element 17*a* of the emergency LED driver (second converter) 17. Likewise, the control circuit 123 can control the clocking of the switch of the second electrical isolation element 17*a* of the emergency LED driver (second converter) 17 and signal a feedback signal via a feedback path 21 to the primary side of the charging circuit 19 via an optocoupler 22 (for example in order to influence the operation of the clocked power switch of the first converter). By using the optocoupler 22, the galvanic isolation between the energy store and the mains voltage 13 is maintained.

The control circuit 123 can in this case again evaluate different information which is supplied by a test switch 24, a current selector apparatus 27 and via a DALI interface 28, for example. Furthermore, the control circuit can again actuate an indicator 20, which signals the emergency lighting operation externally, for example. The control circuit can also evaluate a signal, which is supplied via an interface 29, which is referred to as "smart plug" in FIG. 4. Extended operational information or configurations such as, for example, the duration and magnitude of the battery charging current, can be preset to the emergency lighting device by means of the interface 29. Finally, the control circuit can communicate with other devices via the DALI interface.

A core concept of the invention consists in the isolation of the energy store 18 from the mains voltage present at the light-emitting means 16 by the isolating barrier 11*b*. The invention also makes it possible to regulate the supply of current to the light-emitting means 16 by the energy store 18 via the discharge current of the energy store 18. As a result, it is possible to provide a greater number of different voltages at the light-emitting means 16 than would be enabled by the use of other types of converters such as, for example, boost converters (step-up converters). In addition, an efficiency of the energy store 18 of approximately 80% or higher is achievable at low cost (during quasi-resonant (QR) operation).

Figure 5:
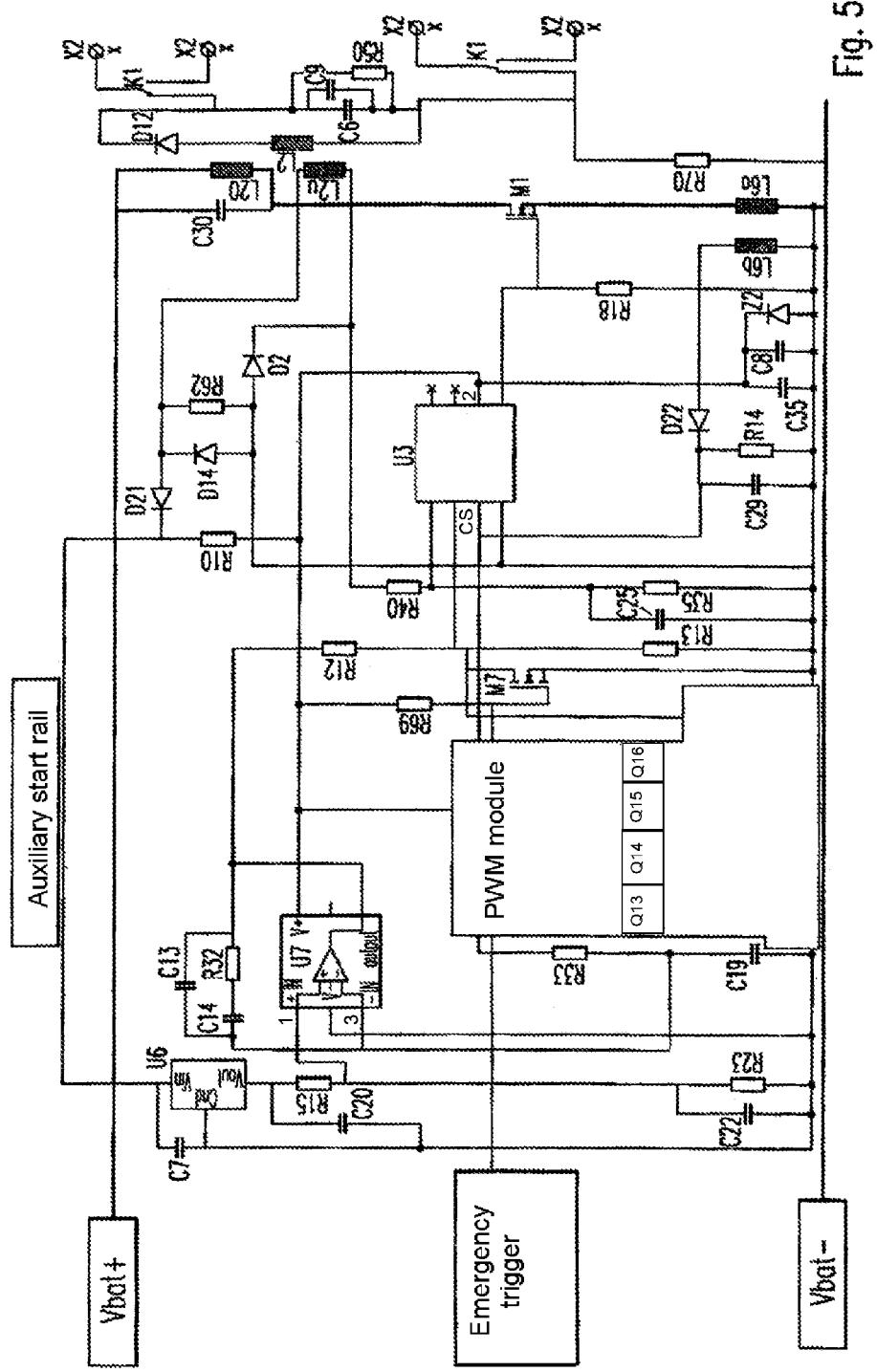
FIG. 5 shows an exemplary circuit diagram detail of the emergency lighting device circuit.

An exemplary more detailed view of relevant circuit parts of the emergency LED driver 17 is shown in FIG. 5. In said figure, a coil L20, a switch M1 and a coil L6*a* form the main circuit on the primary side of the electrical isolation element 17*a* of the emergency LED driver 17; the current is fed directly from the energy store 18 (and possibly a decoupling capacitor). FIG. 5 therefore shows in particular the circuit part for the battery-fed actuation of the electrical isolation element 17*a* or the flyback converter of the emergency LED driver 17. In this case, the electrical isolation element 17*a* has a transformer having the coils L20 and L2. The switch M1 is actuated via the control circuit U3 (IC, microcontroller, ASIC, . . . ). The switch M1 and the transformer comprising the coils L20 and L2 and the diode D12 and the smoothing capacitors C6 and C9 form the main component parts (i.e. the power-transmitting elements) of the electrical isolation element 17*a* or the flyback converter of the emergency LED driver 17.

The energy store 18 is not illustrated directly in FIG. 5, but the terminals Vbat+ and Vbat− are illustrated, which represent the two terminals of the energy store 18.

The detection of the switch current of the switch M1 is performed via a current-detecting transformer comprising coils L6*a* and L6*b*. Thus, a gain can be realized by the current-detecting transformer already in the detection phase. At the same time, the losses are low in comparison with the use of a resistor. The light-emitting means is/are to be connected to the terminals X2, which are shown in FIG. 5.

The current detected at the current-detecting transformer is firstly supplied to an input pin CS (current sense) of the control circuit U3. In particular, an overcurrent detection of the switch current can be performed via the pin CS. Furthermore, the detected current is supplied to the inverting input 3 of an error amplifier U7 via the resistor R33 and the filter capacitor C19. A setpoint value level, which is generated from an integrated circuit (IC) U6 and a resistor R15, is supplied to the noninverting input 1 of the error amplifier U7. The output of the error amplifier U7 is supplied to the control circuit U3 at the feedback pin 2. The control circuit U3 can adjust the on time and optionally also the off time of the radiofrequency clocking and therefore actuation of the switch M1 depending on this signal supplied at the feedback pin 2, said signal is supplied by the current-detecting transformer via the error amplifier U7 to the control circuit U3. Preferably, peak current regulation from cycle to cycle takes place at the pin CS of the control circuit U3, wherein, in the event that a preset value for the peak current is exceeded by the switch M1, the switch M1 is opened, and therefore magnetization of the coil L20 is interrupted. In the subsequent step, there is now discharge of the transformer comprising the coils L2 and L20. The end of this discharge phase can be monitored and identified by the auxiliary winding L2$u$, for example, and then the switch M1 is switched on again. By presetting a corresponding peak current value for the disconnection (opening) of the switch M1 which takes place in the next cycle, therefore, a corresponding duty factor of the switch M1 and therefore an appropriate amplitude ratio for the discharge current which changes at high frequency can be set and therefore the desired average discharge current of the energy store 18 can be regulated (average discharge current regulation takes place).

Therefore, detection of the discharge current of the energy store 18 is performed with the aid of the current-detecting transformer, wherein this detection serves to regulate the discharge current of the energy store 18. As an alternative to the current-detecting transformer, a current-measuring resistor (current-measuring shunt) can also be used for detecting the current through the primary side of the electrical isolation element 17$a$ or the flyback converter and for detecting the discharge current of the energy store 18, for example. In principle, detection of the discharge current of the energy store 18 is performed, wherein the detection can be used to regulate the discharge current or the discharge power of the energy store 18. The current through the switch M1 and through the coil L20 corresponds to the discharge current of the energy store 18.

The arrangement shown in FIG. 5 furthermore has a circuit block "PWM module" consisting of the transistors Q13, Q14, Q15 and Q16. This circuit block represents a PWM module, which is formed by a monostable flipflop, for example. In accordance with one embodiment, the operation of the second flyback converter is a pulsed operation, with a constant duty factor. Provision can also be made for the PWM module to be used additionally or alternatively for the current regulation in the error amplifier U7. Therefore, either operation of the second flyback converter and therefore of the emergency LED driver 17 in pulse trains is possible, wherein the discharge current is adjusted via the duration of the pulse trains and the interval between the pulse trains or permanent operation without low-frequency interpulse periods (and therefore without pulse trains) is possible, wherein the discharge current can be adjusted by the magnitude of the current permitted within a radiofrequency clock on the primary side of the second electrical isolation element 17, preferably the second flyback converter. However, it is also possible to combine both adjustment possibilities, i.e. the discharge current can be adjusted or regulated both by adjusting the magnitude of the current permitted within a radiofrequency clock on the primary side of the second electrical isolation element 17 and via the duration of the pulse trains. The emergency LED deriver 17$a$ therefore provides at least two control systems, which either enable amplitude control or a combination of amplitude and PWM control.

Furthermore, FIG. 5 in particular shows the voltage supply to the control circuit U3. A so-called auxiliary start rail can provide a voltage supply originating from the mains voltage which still provides runup energy at least for the control circuit U3 for a short period of time after a mains voltage failure. In this case, the auxiliary start rail is fed from the mains, but is galvanically isolated from the mains voltage source 13 via the first electrical isolation element of the charging circuit 19, for example. If a low-voltage current source LVPS is provided, the auxiliary start rail does not absolutely need to be provided.

As soon as the control circuit U3 clocks the second electrical isolation element 17$a$, for example a second flyback converter, of the emergency LED driver 17 by means of the switch M1, the control circuit U3 is supplied via an auxiliary winding L2$u$, which feeds a voltage onto the auxiliary start rail after the mains voltage failure via the diode D21. The remaining circuit parts supplied by the auxiliary start rail, for example the unit U6, are then also likewise supplied from the auxiliary winding L2$u$.

A particular advantage of the circuit topology with flyback converter shown will be demonstrated here. The second flyback converter, which is fed by the energy store 18, for example a battery, makes it possible to feed very different LED loads. Therefore, LED strings with, for example, a different number of LEDs, which therefore also require a different supply voltage on the secondary side of the second flyback converter in the emergency LED driver 17, can be fed. Therefore, it may be set up such that a higher secondary-side voltage is generated for a correspondingly higher number of LEDs, wherein, accordingly, the LED current can also decrease. In particular when using regulation or setting of the discharge current of the energy store 18, such an independence from the connected load, i.e., for example, the number or type of LED, is achieved.

The auxiliary winding L2$u$ is used furthermore for indirectly detecting the secondary-side voltage of the second electrical isolation element 17$a$, fed by the energy store 18, of the emergency LED driver 17. When the switch M1 is open, the voltage at the auxiliary winding L2$u$ reflects the output voltage of the electrical isolation element 17$a$, for example the second flyback converter.

Furthermore, the time at which the coil L20 is demagnetized, i.e. discharged, can be detected via the auxiliary winding L2$u$. This can take place via the pin 1 (DMG, i.e. demagnetized) of the control circuit U3. Thereupon, renewed switching-on of the switch M1 can be initiated.

In the event of the presence of an emergency mode trigger signal, the feedback input 2 of the control circuit U3 can no longer be pulled to zero potential via a further switch (for example a MOSFET) M7, with the result that the control circuit U3 can assume its operation. Even during PWM operation, the operation of the control circuit U3 is activated or deactivated selectively by means of a gate input of the further switch M7. In the example illustrated shown in FIG. 5, the PWM signal, as mentioned, can be generated via the PWM module (by means of the transistor network Q13, Q14, Q15 and Q16). Alternatively, the PWM signal can also be generated as output signal by a microcontroller or the like as an alternative form of the PWM module.

The switch M1 is in particular a high-current low-voltage FET. The switch M1 is used since peak current values of up to 10 amperes can occur in the circuit. Furthermore, a current-detecting transformer (also referred to as current-sensing transformer) is used to reduce the losses in the current-sensing resistor R33 and to adjust an appropriate amplitude ratio to the peak current regulation from cycle to cycle at the pin CS of the control circuit U3.

The supply to the circuit units can be provided via the auxiliary start rail if the voltage requirements of said circuit units go beyond the level of the energy store 18. As a result, no boost circuit as LVPS is required since the control circuit U3 starts by means of the auxiliary supply, which is available for a short period of time even after failure of the mains voltage. If a low-voltage current source LVPS is provided as voltage supply, the use of an auxiliary start rail is not absolutely necessary.

The error amplifier U7 in combination with the control circuit U3 makes it possible for the system to adjust the discharge current of the energy store 18 independently of the light-emitting means or the LED load. Preferably, it is not the current or the power of the light-emitting means or the LED load that is regulated or adjusted, but rather the discharge current or the discharge power which is drawn by the energy store 18 is regulated or else adjusted to a preset value. This enables operation of a large number of different LED light-emitting means on the emergency lighting device, in each case with an optimized battery discharge rate and therefore an optimized emergency light emission.

The transistors Q13, Q14, Q15 and Q16 and the switching elements connected thereto, as mentioned, form a PWM generator, illustrated here as PWM module, which enables pulsed operation (low-frequency pulse trains with an interval with respect to one another) of the emergency lighting LED converter 17 and therefore of the LED light-emitting means. Pulsed operation can in some cases be required or advantageous at dimming levels of ≤30%.

The auxiliary winding L2u with the diode D21 in particular forms a forward converter, which can form the low-voltage current source LVPS. The voltage thereof can be proportional to the voltage of the energy store 18, as a result of which a large number of light-emitting means operating voltages is likewise made possible. A typical operating voltage is, for example, approximately 50 volts. This supply is required in order to supply the control circuit U3 and the other circuit parts when the mains voltage fails. In the case of changing voltage conditions, the auxiliary winding L2u can be operated in a flyback mode, in particular in conjunction with the diode D2. In this way, the auxiliary winding L2u can be operated both as a forward converter and in a flyback mode and as a result can form a low-current source LVPS over a wide voltage range of the energy store 18.

The auxiliary winding L2u is used together with the diode D2, the resistor R62 and the diode D14 in order to enable both quasi-resonant operation (QR operation) for reducing the switching losses in the switch M1 and the identification of and disconnection in the case of error conditions, such as, for example, a short circuit and/or an open circuit.

The switch M7 is used to activate or deactivate the second converter of the emergency LED driver both on entry into and on exit out of the emergency lighting operating mode and during pulsed operation of the LED string and the emergency LED driver.

A low battery open-circuit current can be kept in an open-circuit state and made possible since the supply of a low voltage is derived from the coil L20 of the second electrical isolation element 17a or the inductor coil of the second flyback converter of the emergency LED driver 17 and there is therefore no direct connection between the energy store 18 and the light-emitting means 16 owing to the presence of the transformer and therefore the light-emitting means 16 cannot receive a supply without clocking of the second converter or the emergency lighting LED converter 17, and therefore the energy store 18 does not need to be removed. In this way, despite the use of a single-stage converter as discharge circuit or emergency lighting LED converter 17, it is ensured that the energy store 18 is not unnecessarily discharged in an open-circuit state.

One object of the invention consists in generating two types of SELV loads (for example <60 volts DC voltage) and two types of non-SELV loads (for example >60 volts DC). The two versions are provided, for example, in each case three and four energy storage cells, or four and five energy storage cells for optimized light emission. The error identification is fixed at 60 V or 120 V, for example. The control system for the current of the energy store 18 can then increase the voltage of the energy store until the discharge current is optimized, independently of the connected load. In the process, as already explained, the discharge current is regulated, wherein the corresponding voltage at the energy store is set.

A consumer (user) can achieve an increased light output by virtue of more energy storage cells being connected, for example. An example of this regulation scheme can be seen from the graph in FIG. 6.

Figure 6:
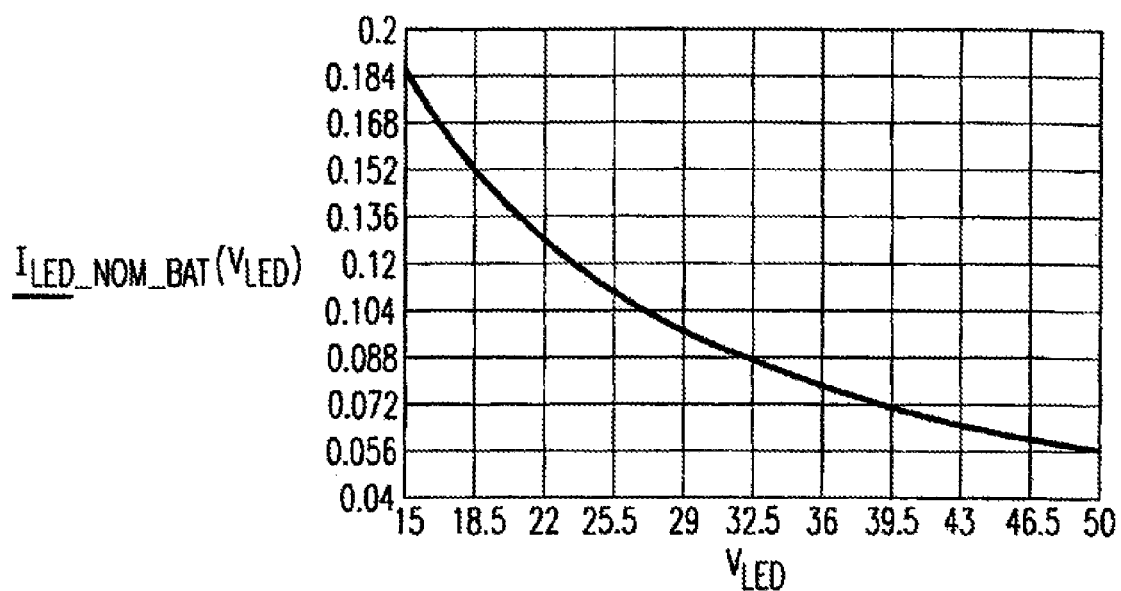
FIG. 6 shows, in an example of a regulation system graph, a dependence of the battery current on the light-emitting means voltage.

In this case, FIG. 6 shows an SELV unit comprising three energy storage cells at a rated voltage of a battery of 3.6 volts and a battery discharge current of 1 ampere. Therefore, the emergency lighting device shown can operate any load up to a predetermined voltage limit (for example 15 volts<$V_{LED}$<60 volts DC and/or, for example, 60 volts DC≤$V_{LED}$<120 volts DC). The emergency lighting device can control or else regulate the discharge current of the energy store 18 and therefore optimize the light emission independently of the connected light-emitting means.

The auxiliary winding L2u of the second converter allows operation in a forward and flyback mode and thus enables provision of a supply with a low voltage and/or identification of a quasi-resonant operation and/or an error state.

Furthermore, a current detection system is provided which limits both the peak currents from cycle to cycle in order to provide, for example, an average discharge current regulation. The emergency lighting device can regulate the discharge current of the energy store by means of a peak current regulation from cycle to cycle; preferably with the aid of current detection by means of the emergency LED driver provides furthermore two control schemes which enable either amplitude control or a combination of amplitude and PWM control.

In particular with respect to the embodiments of the invention with regulation of the discharge current of the energy store, the second converter can alternatively also be formed by another form of clocked converter, for example by a Ćuk converter, a SEPIC converter or an inverter.

The invention claimed is:

1. An emergency lighting device, for actuating a light-emitting means, having
an energy store,
a charging circuit for the energy store comprising terminals for an AC voltage, wherein the charging circuit is a first converter and has a first electrical isolation element,
a clocked second converter, which is supplied from the energy store, comprising at least one switch, wherein the second converter can be supplied exclusively by the energy store,
a control circuit for actuating the at least one switch,
wherein the control circuit actuates the at least one switch in such a way that a discharge current or a discharge power of the energy store is regulated, independently of the light emission of the connected light-emitting means and wherein the control circuit actuates the at least one switch in such a way that a peak current of the discharge current is limited from cycle to cycle.

2. A luminaire comprising an emergency lighting device as claimed in claim 1, wherein the luminaire changes to an emergency lighting operating mode in the event of a change in an operating voltage.

3. An emergency lighting device for actuating a light-emitting means, having
  an energy store,
  a charging circuit for the energy store comprising terminals for an AC voltage, wherein the charging circuit has a first electrical isolation element, which is a first flyback converter,
  an electrically isolated clocked second converter, having a second electrical isolation element, which is supplied from the energy store, comprising at least one switch, which is a second flyback converter, wherein the second converter can be supplied exclusively by the energy store,
  a control circuit for actuating the at least one switch,
  and a supply path from a secondary side of the second converter to terminals for the light-emitting means, wherein energy can be supplied to the control circuit via a secondary-side auxiliary winding at the first electrical isolation element or a primary-side auxiliary winding at the second electrical isolation element.

4. The emergency lighting device as claimed in claim 3, wherein the secondary-side auxiliary winding at the first electrical isolation element is configured in such a way that energy can be supplied to the control circuit until the second converter is operated in clocked fashion by the control circuit.

5. The emergency lighting device as claimed in claim 3, wherein the control circuit is designed to detect the secondary-side voltage at the second electrical isolation element via the primary-side auxiliary winding at the second converter.

6. The emergency lighting device as claimed in claim 3, wherein the time at which a primary-side coil of the second converter is demagnetized can be detected by the control circuit via the primary-side auxiliary winding at the second converter.

7. The emergency lighting device as claimed in claim 6, wherein the control circuit is configured to initiate renewed switching-on of the clocked switch in the case of detection of demagnetization of the primary-side coil of the second converter.

8. An emergency lighting device for actuating a light-emitting means, having
  an energy store,
  a charging circuit for the energy store comprising terminals for an AC voltage, wherein the charging circuit has a first electrical isolation element, which is a first flyback converter,
  an electrically isolated clocked second converter, having a second electrical isolation element, which is supplied from the energy store, comprising at least one switch, which is a second flyback converter, wherein the second converter can be supplied exclusively by the energy store,
  a control circuit for actuating the at least one switch,
  and a supply path from a secondary side of the second converter to terminals for the light-emitting means wherein a primary-side auxiliary winding at the second electrical isolation element is configured in such a way that energy can be supplied to the control circuit when the second converter is operated in clocked fashion by the control circuit.

9. The emergency lighting device as claimed in claim 8, wherein the control circuit is configured to regulate power drawn by the second converter from the energy store or a drawn discharge current.

* * * * *